(12) United States Patent
Chao

(10) Patent No.: US 7,190,579 B2
(45) Date of Patent: Mar. 13, 2007

(54) DATA PROCESSING SYSTEM WITH AIR PURIFYING DEVICE

(75) Inventor: James Lee Chao, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 10/880,768

(22) Filed: Jun. 29, 2004

(65) Prior Publication Data

US 2005/0286224 A1    Dec. 29, 2005

(51) Int. Cl.
*H05K 7/20*    (2006.01)

(52) U.S. Cl. .................. 361/695; 361/687; 361/690; 361/694; 96/15; 96/53; 165/80.3; 174/15.1; 174/16.1

(58) Field of Classification Search ................ 361/695, 361/687, 690, 694, 717–719; 96/15, 63; 165/80.3; 174/15.1, 16.1
See application file for complete search history.

(56) References Cited

U.S. PATENT DOCUMENTS

| | | | |
|---|---|---|---|
| 3,361,337 A * | 1/1968 | Hurst | 315/111.91 |
| 4,682,993 A | 7/1987 | Todd et al. | |
| 4,702,154 A | 10/1987 | Dodson | |
| 5,223,006 A | 6/1993 | Moran, III | |
| 5,559,673 A | 9/1996 | Gagnon et al. | |
| 5,573,577 A | 11/1996 | Joannou | |
| 5,667,564 A * | 9/1997 | Weinberg | 96/58 |
| 5,669,963 A | 9/1997 | Horton et al. | |
| 5,827,340 A | 10/1998 | Fiske | |

(Continued)

FOREIGN PATENT DOCUMENTS

CN    2463872    * 12/2001

(Continued)

OTHER PUBLICATIONS

Wein Products literature for AS150MM (http://www.weinproducts.com/airsupplycomparison.htm) printed on Jan 12, 2006.*

(Continued)

*Primary Examiner*—Michael Datskovsky
*Assistant Examiner*—Robert J. Hoffberg
(74) *Attorney, Agent, or Firm*—Josh J. Cockburn; Dillon & Yudell LLP

(57) ABSTRACT

An air purifying data processing system includes a chassis, a planar, a microprocessor and an air purifier. The air purifier produces purified air that is exhausted exterior to the chassis to improve the air quality in the vicinity of the chassis. The air purifier produces an air flow that is preferably in proximity to the microprocessor to facilitate dissipation of heat generated by the microprocessor. The air purifier may be oriented to direct the air flow through an opening in a first face of the chassis. The air purifier may include a high voltage unit to create an electrical discharge within the air purifier. The high voltage unit preferably produces a voltage greater of 8000 V or at an output point of the high voltage unit. The air purifier includes a grounded and electrically conductive grid in the vicinity of the high voltage unit output point.

11 Claims, 3 Drawing Sheets

U.S. PATENT DOCUMENTS

| | | |
|---|---|---|
| 5,942,017 A | 8/1999 | Van Winkle, Sr. |
| 5,993,520 A | 11/1999 | Yu |
| D446,849 S * | 8/2001 | Weinberg .................. D23/364 |
| 6,522,536 B2 * | 2/2003 | Brewer et al. .............. 361/687 |
| 6,556,272 B1 * | 4/2003 | Du et al. ...................... 352/85 |
| 6,754,077 B2 * | 6/2004 | Lo et al. ..................... 361/700 |
| 2003/0137794 A1 * | 7/2003 | Izumi et al. ................ 361/231 |
| 2004/0226445 A1 * | 11/2004 | Su et al. ........................ 96/15 |
| 2005/0047056 A1 * | 3/2005 | Huang ........................ 361/212 |
| 2005/0175518 A1 * | 8/2005 | Lin et al. ................. 422/186.3 |

FOREIGN PATENT DOCUMENTS

| | | | |
|---|---|---|---|
| JP | 08-250878 | * | 9/1996 |
| WO | WO 01/69357 | * | 9/2001 |

OTHER PUBLICATIONS

Wein Products product release for AS150MM, PR Newswire, New York, dated Apr. 23, 2003 (ProQuest document ID. 327381321).*

* cited by examiner

DATA PROCESSING SYSTEM WITH AIR PURIFYING DEVICE

BACKGROUND

1. Field of the Present Invention

The present invention is in the field of data processing systems and, more particularly, data processing systems and electronic devices that employ active heat dissipation devices.

2. History of Related Art

Notebook computers, personal data administrators (PDAs), cellular telephones and an increasing number of emerging data processing devices may be characterized as mobile electronic devices that are inevitably but undesirably exposed to a wide range of environmental conditions. For such mobile devices, reliability is a particularly significant concern. The presence of environmental moisture, dust particulates, and other types of corrosive pollutants contribute to the failure rate for mobile devices particularly in components such as ribbon connectors used to connect displays, keyboards, optical disc drives, and track points to a central planar such as a motherboard or electronic circuit card.

In addition, there is evidence suggesting that the environments in which mobile devices have proliferated are environments that present problems not just for mobile data processing systems, but for the users of those systems as well. Mobile devices, for example, are extremely popular in developing economies where wire-based infrastructures may not exist. These environments are frequently subject to less than stringent environmental regulation. As a result, personal air purifiers are widely used in these locations. Even in highly regulated environments the awareness of these particulates has increased. Unfortunately, even the most recent and smallest personal air purifiers present a drawback in that they must be worn by or somehow attached to the user.

It would be desirable to implement a data processing system that addressed the reliability issues noted above. These reliability issues stem from corrosion of electrical contacts resulting in functional failures due to the environmental presence of environmental pollutants such as SO2, NO2, NH3, Cl2, and H2S as well as others. It would be further desirable if the implemented system also had a positive impact on the user's personal environment by reducing undesirable particulates that may affect long term health effects related to asthma, allergens, noxious fumes, and other pathogens of both synthetic and natural sources.

SUMMARY OF THE INVENTION

The objectives identified above are addressed according to the present invention by a data processing system that incorporates an internal air purifier. The internal air purifier reduces the particulate and contaminant count within the system's chassis and improves the air quality in the surrounding environment thereby providing an improved working environment for the system's user. In one embodiment, the data processing system includes a microprocessor and some system memory modules or digital storage connected to a planar (printed circuit board). The air purifier is preferably located in proximity to the microprocessor. In one embodiment, the air purifier is oriented to exhaust purified air to the environment exterior to the chassis. The purifying means in one embodiment of the air purifier generates a DC voltage in excess of approximately 8000 V at a point proximal to a grounded, conductive screen to create an electric discharge (sometimes referred to as a corona discharge) that is accompanied by ionization of the surrounding atmosphere. Air contaminants are attracted and collected in one embodiment by electrostatic means, removing these corrosive elements, particles, etc., thereby protecting the delicate electrical subcomponents in the electronic device, and at the same time, protecting the personal user's immediate environment. The system may also create ozone in the electrical discharge at suitable concentrations to render airborne pathogens such as bacteria, harmless. The air purifier may be implemented either with or without an accompanying fan. The air purifier according to the present invention provides multiple simultaneous benefits including, reduction or elimination of corrosive pollutants within the system chassis, generation of air flow within the chassis that may be oriented to providing desirable heat dissipation to the microprocessor or other components, and the purification of the environmental air exterior to the system chassis.

BRIEF DESCRIPTION OF THE DRAWINGS

Other objects and advantages of the invention will become apparent upon reading the following detailed description and upon reference to the accompanying drawings in which.

Figure 1:
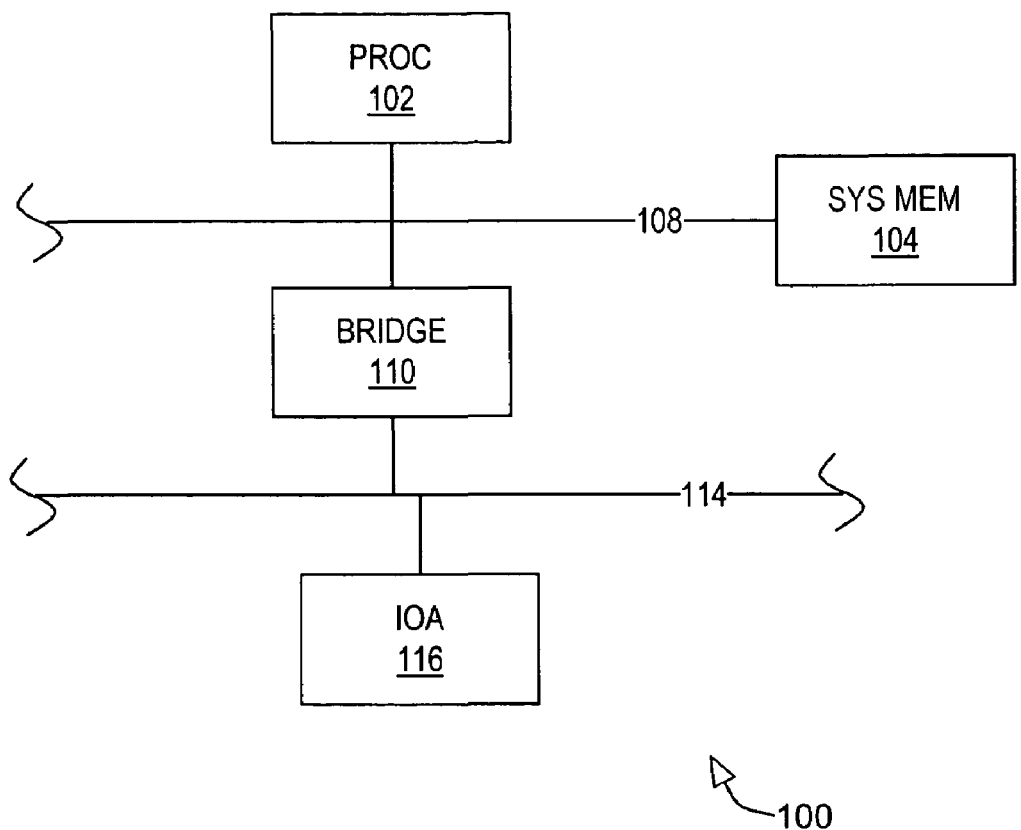
FIG. 1 is a block diagram of selected elements of a data processing system in which an air purifying mechanism according to one embodiment of the invention may be suitable employed.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates an electronic data processing system or device that includes an air purification device. The air purification device is located within system chassis and is oriented to propel or discharge purified air through some form of opening in the chassis to the exterior environment. The air purifying device thus eliminates corrosive contaminants from the interior of the chassis while simultaneously improving the quality of the air external to the chassis where it can be breathed by the user.

Referring now to the drawings, FIG. 1 is a block diagram of selected elements of a data processing system 100 that is suitable for use with an air purification mechanism according to the present invention. In the depicted embodiment, system 100 includes at least one general purpose microprocessor 102 having access to a system memory 104 via a system bus 108. A bridge 110 provides an interface between system bus 108 and a peripheral bus 114 to which at least one peripheral device adapter, also referred to as an input/output adapter (IOA) 116 is attached. This general design will be familiar to those knowledgeable in the design of conventional desktop and notebook computers. Processor 102 may be implemented with any of a variety of commercially distributed microprocessors including the PowerPC® family of microprocessor from IBM Corporation as well as the x86 family of microprocessors available from vendors including Intel Corporation and Advanced Micro Devices.

Peripheral bus 114 may be implemented as an industry standard peripheral bus such as the widely implemented PCI bus. IOA 116 could include any of various peripheral adapters including, as examples, a graphics adapter, a network adapter, or a disk drive adapter. Although the implementation of system 100 depicted in FIG. 1 is representative of conventional notebook computers, the invention is applicable in virtually any electronic device or system that incorporates a microprocessor or digital circuit within a portable chassis or enclosure.

Figure 2:
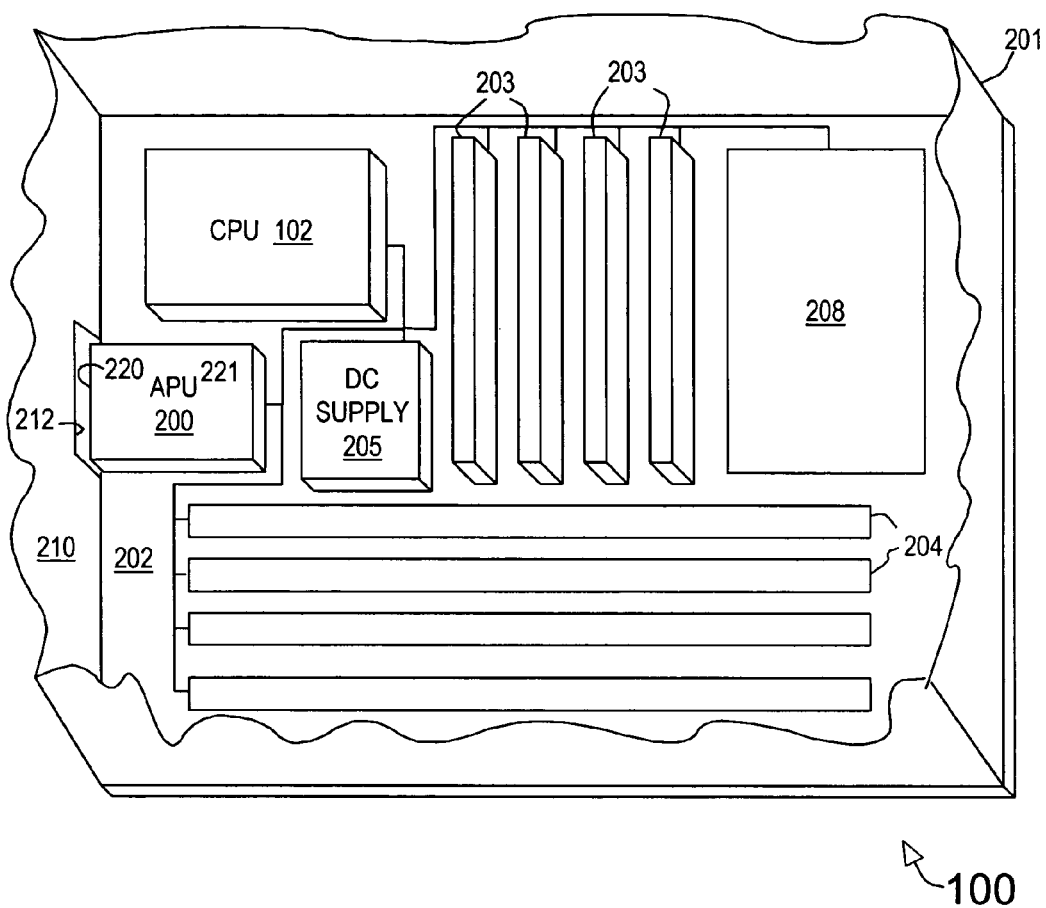
FIG. 2 is a perspective view of a portion of a data processing system according to one embodiment of the present invention including an air purification device.

Referring now to FIG. 2, a perspective view of an implementation of data processing system 100 of FIG. 1 is shown. As shown in FIG. 2, system 100 is implemented by attaching the components depicted in FIG. 1 to a planar (printed circuit board) 202. Planar 202 is located within a chassis 201 (which is cut away in the view of FIG. 2). As shown in FIG. 2, Cpu 102 is directly connected to planar 202, system memory 104 is implemented as a set of memory modules 203 connected to planar 202 and peripheral adapters such as IOA 116 of FIG. 1 are connected to standardized expansion slots 204 as is well known. A source of DC power 205 provides power to each the functional units shown. DC power source 205 may be implemented as a transformer that receives AC power from a conventional electrical outlet or as a rechargeable battery.

In the depicted embodiment, an air purifying unit (APU) 200 according to the present invention is connected to planar 202. In the illustrated implementation, APU 200 is located proximal to CPU 102 to enable APU 200 to provide thermal cooling benefits to CPU 102. More specifically, APU 200 is configured to produce an air flow that, when oriented properly, might enable the elimination or reduction in size of any heat dissipation hardware (not shown explicitly) associated with CPU 102. In conventional microprocessor-based systems, it is typically necessary to use large heat sinks and/or cooling fans to maintain acceptable thermal conditions for CPU 102. In the case of directly attached cooling fans (sometimes referred to as fan sinks), the fans simply move the air that is present within chassis 201 over CPU 102 at an increased velocity. Conventional fans, therefore, do not provide any benefit in terms of reducing the quantity of contaminants within chassis 201 and may, in fact, facilitate the introduction of a wider range or higher quantity of contaminants.

The APU 200 according to one embodiment of the invention is oriented on planar 202 to achieve multiple objectives. In the embodiment depicted in FIG. 2, for example, APU 200 includes an output face 220 that is located in proximity to an opening 212 formed in a panel or face 210 of chassis 201. APU 200 generates an air flow that is oriented from an interior face 221 of APU 200 to the output face 220. In this configuration, APU 200 provides heat dissipation benefits to CPU 102 by creating an air flow in the vicinity of CPU 102. In addition, APU 200 improves reliability by purifying the air within chassis 201. The specific orientation of APU 200 relative to CPU 102 is implementation specific and may vary depending on the location of CPU 102, the size of APU 200, the dimensions of chassis 201, and other considerations such as the space available within chassis 201. Generally, however, APU 200 creates an air flow in the vicinity of or proximal to CPU 102 that is exhausted to the exterior environment (exterior to chassis 201.

The orientation of APU 200 depicted in FIG. 2 provides a benefit in addition to reducing the contaminant count within chassis 201 and facilitating dissipation of heat produced by CPU 102. As APU vents purified air through output face 220, the air quality exterior to chassis 201 is the vicinity of system 100 is improved. A user of system 100 benefits from being able to breathe air that contains less contaminants and pollutants. Many occupations and activities require a user to spend a significant amount of time in close proximity to a data processing system or electronic devices such as system 100. By incorporating an air purification device internal to the system, the present invention achieves a benefit provided by commercially available personal air purifying devices without requiring the user to wear or otherwise attach the air purification device to the user's body or clothing.

Figure 3:
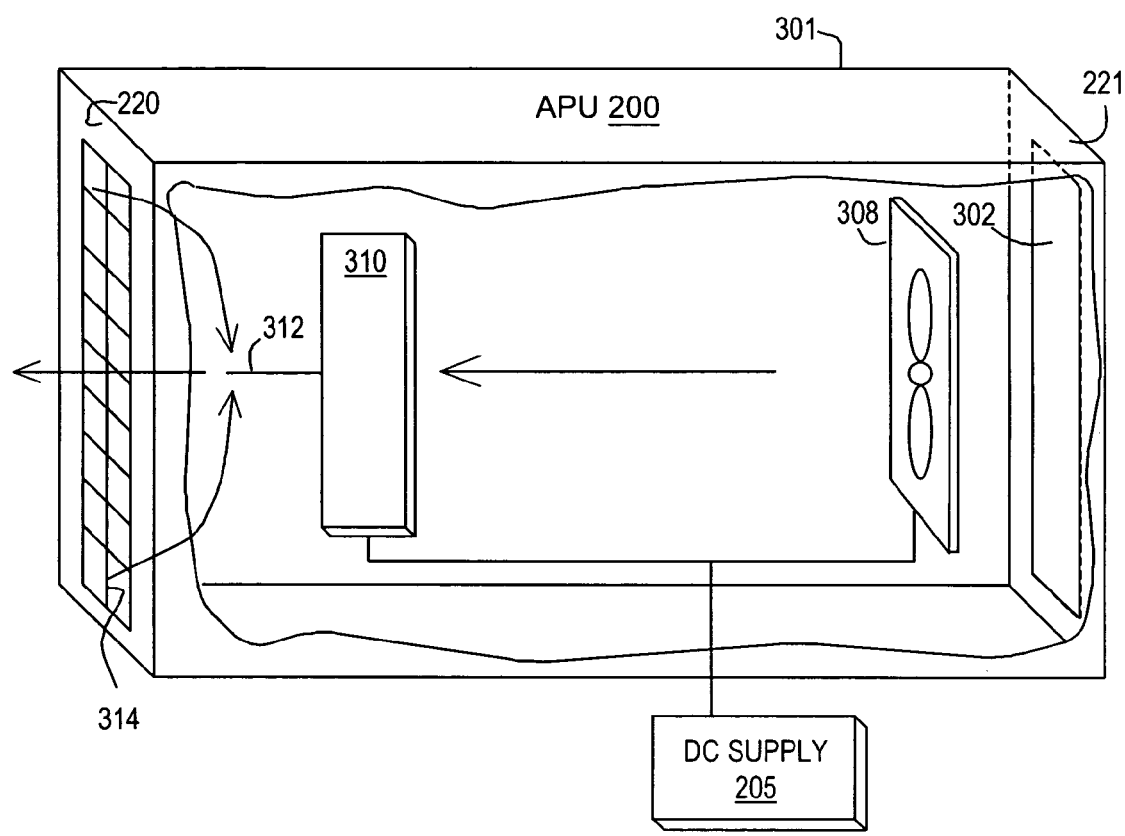
FIG. 3 is a block diagram of selected elements of an embodiment of the air purification device of FIG. 2.

Referring now to FIG. 3, selected elements of an embodiment of APU 200 are depicted. In the depicted embodiment, APU 200 includes a chassis 301 that includes an opening 302 in the interior face 221 and a grid 314 formed in the output face 220. In the depicted embodiment, a fan 308 and a high voltage unit 310 are connected to DC power supply 205, which is shown exterior to APU 200.

Fan 308 facilitates air flow from interior face 221 to output face 220. High voltage unit 310 produces a DC voltage of (or a pulsed voltage with an amplitude of) 8000 V or more at an output point 312 of high voltage unit 310. The voltage at output point 312 produces an electrical discharge that is accompanied by ionization of the surrounding atmosphere.

The output point 312 in the preferred embodiment is located in proximity to grid 314. Grid 314 is comprised of a conductive metal or alloy and is electrically grounded. The arrangement of grid 314 is implementation specific and may include honeycomb designs, rectangular designs, and so forth. The electrical field generated between output point 312 and grid 314 causes ionized particles to accelerate towards grid 314 and thereby cause a flow of air to be vented out through grid 314 away from APU 200. When APU 200 is oriented appropriately (i.e. with output face 220 in the vicinity of a chassis opening such opening 212 of FIG. 2), the air flow caused by APU 200 will introduce purified air into the user's environment.

It is important to note that the fan 308 is an optional feature of APU 200. In an alternative embodiment, APU 200 is fully functional for achieving the beneficial objectives described above even when APU 200 lacks the fan. In a fan-less implementation, the air flow caused by maintaining the high voltage potential on output point 312 is sufficient, by means of particulate attraction attributable to electrostatic forces, to achieve adequate cooling of the nearby microprocessor and to provide purified air to the external user. In one embodiment, the air flow caused by the ionized electrical discharge surrounding output point 312 is preferably at least 50 ft/min and still more preferably at least 100 ft/min.

APU 200 is preferably compact and light weight. The preferred implementation of APU 200 is smaller than 4 cubic inches and weighs no more than 1.5 ounces. APU 200 may include elements of design found in commercially distributed personal or portable air purification units such as the Air Supply Mini Matic Ionic (AS150MM) personal air purifier available from Wein Products, Inc. APU 200 is preferably powered by the power to the electronic device so that the battery used in the wearable Wein unit is not needed, thus saving space and weight, valuable design elements for portable mobile devices including notebook computers, PDAs, and cellular phones. This feature is indicated by the location of DC power supply 205 exterior to APU 200 as shown in FIG. 2 and FIG. 3. In other embodiments (not depicted), it may be desirable to include a DC power supply within APU 200.

Figure 4:
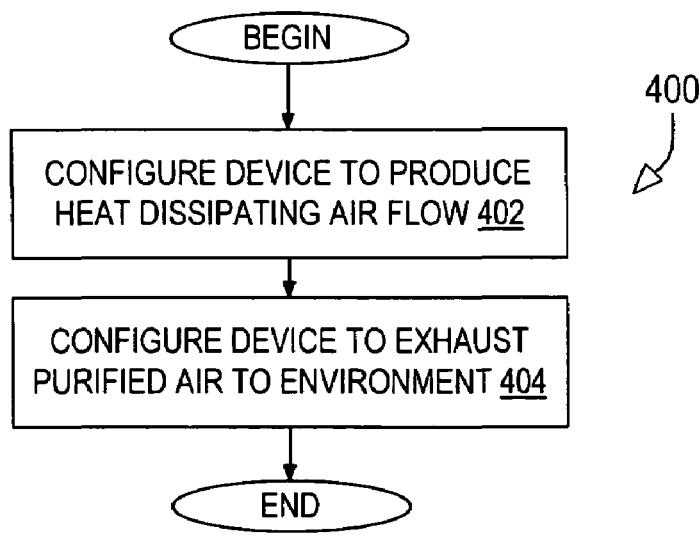
FIG. 4 is a flow diagram of a service for providing an electronic device according to one embodiment of the invention.

Turning to FIG. 4, one embodiment of the present invention is implemented as a service 400 by which an electronic device having a portable chassis, a microprocessor located within the chassis or enclosure, and system memory accessible to the microprocessor is modified or configured (block 402) to produce an air flow within the chassis or enclosure that facilitates dissipation of heat generated by the microprocessor. The service also includes modifying or configuring (block 404) the electronic device to exhaust purified air into the user environment surrounding the device. Service 400 may include modifying of configuring an electronic device to have the elements of system 100 as described above including an air purifier having a high voltage unit capable of creating an electrical discharge.

It will be apparent to those skilled in the art having the benefit of this disclosure that the present invention contemplates a mechanism for providing purified air both within and around a data processing device. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data processing system, comprising:
   a chassis;
   a planar within the chassis;
   a microprocessor connected to the planar; and
   an air purifier connected to the planar proximal to the microprocessor, wherein the air purifier produces purified air that is exhausted exterior to the chassis to improve the air quality in the user environment surrounding the chassis;
   wherein the air purifier includes a high voltage unit to create an electrical discharge within the air purifier;
   wherein the high voltage unit produces a voltage greater than or equal to approximately 8000 at an output point of the high voltage unit;
   wherein the air purifier includes a grounded and electrically conductive grid in the vicinity of the high voltage unit output point; and
   wherein the air purifier produces an air flow in proximity to the microprocessor wherein the purified air exhausted to the exterior facilitates dissipation of heat generated by the microprocessor.

2. The system of claim 1, wherein the air purifier is oriented to direct the air flow through an opening in a first face of the chassis.

3. The system of claim 1, wherein the air purifier generates and air flow of at least 50 ft/mm.

4. The system of claim 3, wherein the air purifier is dimensioned to occupy less than 4 cubic inches and to weigh approximately 1.5 ounces or less.

5. The system of claim 1, wherein the air purifier is powered by an external power supply that powers the system.

6. A mobile data processing electronic device, comprising:
   a portable enclosure;
   a microprocessor located within the enclosure and system memory accessible to the microprocessor; and
   an air purifier within the enclosure, wherein the air purifier produces an electrostatic air flow that facilitates dissipation of heat generated by the microprocessor, and wherein the air purifier exhausts purified air into the user's environment surrounding the data processing electronic device;
   wherein the air purifier purifies air using an electrical discharge created within the air purifier;
   wherein the air purifier includes a high voltage unit to produce a DC voltage of approximately 8000 V in proximity to an electrically grounded grid through which the purifier air can pass; and
   wherein the air purifier is powered by a power source, external to the air purifier, that powers the electronic device.

7. The device of claim 6, wherein the air purifier lacks a fan yet produces an air flow at least 50 ft/mm.

8. A service in connection with an electronic device, comprising enabling a data processing electronic having a portable chassis, a microprocessor located within the chassis, and system memory accessible to the microprocessor to produce an electrostatic air flow that facilitates dissipation of heat generated by the microprocessor and to exhaust purified air into the user's environment surrounding the data processing electronic device, wherein the air purifier is powered by an external power supply that powers the electronic device; wherein enabling the electronic device includes configuring the electronic device with an air purifier having a DC high voltage unit to create an electrical discharge within the air purifier; wherein the high voltage unit produces a voltage greater than or equal to approximately 8000 at an output point of the high voltage unit; and wherein the air purifier includes a grounded and electrically conductive grid in the vicinity of the high voltage unit output point.

9. The service of claim 8, wherein enabling the electronic device to produce the air flow further comprises enabling the electronic device to direct the air flow through an opening in a first face of the chassis.

10. The service of claim 8, wherein the air purifier generates an air flow of at least 50 ft/mm.

11. The service of claim 10, wherein the air purifier is dimensioned to occupy less than 4 cubic inches and to weigh approximately 1.5 ounces or less.

* * * * *